United States Patent
Florentino et al.

(10) Patent No.: US 10,430,594 B2
(45) Date of Patent: Oct. 1, 2019

(54) EXTRACTION OF POLICIES FROM STATIC PERMISSIONS AND ACCESS EVENTS FOR PHYSICAL ACCESS CONTROL

(71) Applicant: Carrier Corporation, Palm Beach Gardens, FL (US)

(72) Inventors: Blanca Florentino, Cork (IE); Tarik Hadzic, Cork (IE); Philip J. Harris, Cork (IE); Menouer Boubekeur, Cork (IE); Stylianos Basagiannis, Cork (IE); Keith J. Power, Cork (IE); Brian Duffy, Cork (IE); Ankit Tiwari, Cork (IE); John Marchioli, Pittsford, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/778,470

(22) PCT Filed: Nov. 17, 2016

(86) PCT No.: PCT/US2016/062465
§ 371 (c)(1),
(2) Date: May 23, 2018

(87) PCT Pub. No.: WO2017/091434
PCT Pub. Date: Jun. 1, 2017

(65) Prior Publication Data
US 2018/0341778 A1 Nov. 29, 2018

Related U.S. Application Data

(60) Provisional application No. 62/259,893, filed on Nov. 25, 2015.

(51) Int. Cl.
*G06F 21/60* (2013.01)
*G07C 9/00* (2006.01)
(Continued)

(52) U.S. Cl.
CPC ........ *G06F 21/604* (2013.01); *G06F 21/6218* (2013.01); *G07C 9/00571* (2013.01);
(Continued)

(58) Field of Classification Search
None
See application file for complete search history.

(56) References Cited

U.S. PATENT DOCUMENTS 6,820,082 B1   11/2004   Cook et al.
7,249,369 B2   7/2007    Knouse et al.
(Continued)

OTHER PUBLICATIONS

Afonin, Sergey, "Towards a Rule-based Access Control Framework for Distributed Information Systems", MIPRO, Institute of Mechanics, Moscow State University, 2015, ISS, pp. 1544-1549.
(Continued)

*Primary Examiner* — Carlos Garcia
(74) *Attorney, Agent, or Firm* — Cantor Colburn LLP (57) ABSTRACT

A system for generating at least one policy includes a static permission database containing a plurality of static permission records identifying access permissions for at least one credential holder to at least one resource, a policy database, and a processor to analyze the plurality of static permission records to generate the at least one policy, wherein an outcome of execution of the at least one policy corresponds to the plurality of static permission records.

24 Claims, 3 Drawing Sheets

(51) Int. Cl.
*G06F 21/62* (2013.01)
*H04L 29/06* (2006.01)

(52) U.S. Cl.
CPC .. *H04L 63/102* (2013.01); *G07C 2009/00769* (2013.01); *G07C 2209/04* (2013.01)

(56) References Cited

U.S. PATENT DOCUMENTS

| | | | |
|---|---|---|---|
| 7,809,667 | B1 | 10/2010 | Yehuda et al. |
| 8,010,991 | B2 | 8/2011 | Sarukkai et al. |
| 8,234,704 | B2 | 7/2012 | Ghai et al. |
| 8,250,045 | B2 | 8/2012 | Er et al. |
| 8,423,483 | B2 | 4/2013 | Sadeh-Koniecpol et al. |
| 8,548,452 | B2 | 10/2013 | Coskun et al. |
| 8,560,836 | B2 | 10/2013 | Roegner |
| 8,607,325 | B2 | 12/2013 | Kennedy |
| 8,635,689 | B2 | 1/2014 | Hernandez et al. |
| 8,667,556 | B2 | 3/2014 | Chang et al. |
| 8,694,629 | B2 | 4/2014 | Cutler et al. |
| 8,762,304 | B2 | 6/2014 | Chitapur et al. |
| 8,769,412 | B2 | 7/2014 | Gill et al. |
| 8,874,766 | B2 | 10/2014 | Nedbal et al. |
| 8,955,038 | B2 | 2/2015 | Nicodemus et al. |
| 8,983,877 | B2 | 3/2015 | Chari et al. |
| 9,094,812 | B2 | 7/2015 | Marsico |
| 2003/0191730 | A1 | 10/2003 | Adkins et al. |
| 2007/0143827 | A1 | 6/2007 | Nicodemus et al. |
| 2007/0219990 | A1* | 9/2007 | Crivat ................... G06F 16/283 |
| 2007/0282778 | A1* | 12/2007 | Chan ........................ G06N 5/02 706/48 |
| 2008/0209505 | A1 | 8/2008 | Ghai et al. |
| 2008/0218373 | A1* | 9/2008 | Lanigan ............. G07C 9/00182 340/5.1 |
| 2011/0209197 | A1 | 8/2011 | Sardanopoli |
| 2012/0117608 | A1 | 5/2012 | Metke et al. |
| 2012/0216243 | A1 | 8/2012 | Gill et al. |
| 2014/0129457 | A1 | 5/2014 | Peeler |
| 2014/0173404 | A1* | 6/2014 | Robelin ................ G06F 17/243 715/221 |
| 2014/0196104 | A1* | 7/2014 | Chari ..................... H04L 63/20 726/1 |
| 2014/0279808 | A1 | 9/2014 | Strassner |
| 2014/0359695 | A1 | 12/2014 | Chari et al. |
| 2015/0082377 | A1 | 3/2015 | Chari et al. |
| 2015/0100333 | A1* | 4/2015 | Fitzgerald ............ G06Q 30/018 705/2 |

OTHER PUBLICATIONS

Busch, Sonke et al.., "Authrule: A Generic Rule-Based Authorization Module", Conference Paper in Lecture Notes in Computer Science • Jul. 2006, 16 pages.

Federal Chief Information Officers Council and the Federal Enterprise Architecture, "Federal Identity, Credential, and Access Management (FICAM) Roadmap and Implementation Guidance", available at: https://www.idmanagement.gov/wp-content/uploads/sites/1171/uploads/FICAM_Roadmap_and_Implem_Guid.pdf, , Dec. 2, 2011, 478 pages.

Frank, Mario et al., "On the definition of role mining", Proceeding of the 15th ACM Symposium on Access Control Models and Tech., Jun. 9, 2010, 10 pages.

Frank, Mario et al., "Role Mining with Probabilistic Models". ACM Transactions on Information and System Security, vol. 15, No. 4, Article 15, Apr. 2013, 28 pages.

Hu, Vincent et al., "Guide to Attribute Based Access Control (ABAC) Definition and Considerations", National Institute of Standard and Technology, U.S. Dept. of Commerce, Jan. 2014, 46 pages.

International Search Report and Written Opinion for application PCT/US2016/062465, dated Apr. 5, 2017, 17 pages.

Xu, Zhongyuan et al., "Mining Attribute-Based Access Control Policies from Logs" 28th IFIP Annual Conference on Data and Applications Security and Privacy (DBSec), Jul. 2014, 17 pages.

Zhang, Wen et al., "Evolving Role Definitions Through Permission Invocation Patterns", SACMAT'13, Jun. 12-14, 2013, 11 pages.

\* cited by examiner

EXTRACTION OF POLICIES FROM STATIC PERMISSIONS AND ACCESS EVENTS FOR PHYSICAL ACCESS CONTROL

The subject matter disclosed herein relates to extraction of rule-based policies from static permissions for physical access control, and to a system and a method for extracting rule-based policies from static permissions for physical access control.

DESCRIPTION OF RELATED ART

Typically, physical access control systems, e.g. building access control systems, ensure that only authorized users (credential holders, cardholders) have the ability to access protected areas and under correct circumstances. For example, a physical access control system may compare a provided credential to a stored static permission to allow or deny access to an area at a given time. Further, such a static permission may refer to a single resource (a single reader) or a grouping of resources (a collection of readers in a certain area). Static permission may also refer to circumstantial conditions (such as time during the week) when the access is allowed or denied.

Physical access control systems require administrative tasks to add, remove, and update static permissions to ensure proper static permissions and the effective use of the physical access control system. Administrative tasks traditionally utilize manual operations, consuming time and introducing the risk of incorrect permission records. Rule-based policies can effectively manage dynamic changes that affect correctness of permission records, such as changes to user properties, organizational structure, resource properties (such as sensitivity levels) etc. Existing access control systems that use such rule-based policies are using them for dynamic processing of individual requests for access which requires a system that is capable of running a rule engine in real time to process access requests. Such systems capable of dynamic processing are often incompatible with existing physical access control systems which use a software and hardware architecture that requires availability of static permissions to determine access. Therefore, transitioning to a system capable of dynamic processing requires creating rule-based policies corresponding to previously defined static permissions of the legacy system. Manually creating corresponding rule-based policies would be costly and impractical. A system and method that can generate rule-based policies from static permissions is desired.

BRIEF SUMMARY

According to one embodiment, a system for generating at least one policy includes a static permission database containing a plurality of static permission records identifying access permissions for at least one credential holder to at least one resource, a policy database, and a processor to analyze the plurality of static permission records to generate the at least one policy, wherein an outcome of execution of the at least one policy corresponds to the plurality of static permission records.

In addition to one or more of the features described above, or as an alternative, further embodiments could include that the processor utilizes pattern mining to analyze the plurality of static permission records to generate the at least one policy.

In addition to one or more of the features described above, or as an alternative, further embodiments could include that the at least one policy is a collection of one or more rules and each rule including at least one of user properties, resource properties, and environment properties, each rule including an access decision which determines whether a corresponding user satisfying the user properties can or cannot have access to the at least one resource satisfying the resource properties, in an environment satisfying the environment properties.

In addition to one or more of the features described above, or as an alternative, further embodiments could include that the processor analyzes an impact of each rule on the at least one policy.

In addition to one or more of the features described above, or as an alternative, further embodiments could include that the processor selectively adds, removes or modifies each rule from the at least one policy in response to an administrator input.

In addition to one or more of the features described above, or as an alternative, further embodiments could include that the processor analyzes each rule to determine a rule complexity metric.

In addition to one or more of the features described above, or as an alternative, further embodiments could include that the processor analyzes each rule with the plurality of static permission records to determine a rule accuracy metric.

In addition to one or more of the features described above, or as an alternative, further embodiments could include that the processor analyzes each rule with the plurality of static permission records to determine a rule statistical significance metric.

In addition to one or more of the features described above, or as an alternative, further embodiments could include that the processor analyzes the plurality of static permissions to generate an anomaly database.

In addition to one or more of the features described above, or as an alternative, further embodiments could include a violation database containing a plurality of static permission records which violate one or more of policies as computed by the processor In addition to one or more of the features described above, or as an alternative, further embodiments could include a committed violation database containing a plurality of access events records which violate one or more of policies as computed by the processor.

In addition to one or more of the features described above, or as an alternative, further embodiments could include an exception database containing a plurality of exception static permission records exempt from the plurality of policies.

In addition to one or more of the features described above, or as an alternative, further embodiments could include that the processor analyzes the plurality of exception static permission records to generate the at least one policy.

In addition to one or more of the features described above, or as an alternative, further embodiments could include that the static permission database contains an access events database containing at least one of a plurality of access event records, and an administrator logs database containing a log of administrator actions and the processor analyzes at least one of the plurality of access event records and the log of administrator actions to generate the at least one policy.

In addition to one or more of the features described above, or as an alternative, further embodiments could include that the processor analyzes each rule with the plurality of static permission records with respect to at least one of the plurality of access event records and the log of administrator actions to determine a weighted rule accuracy metric.

In addition to one or more of the features described above, or as an alternative, further embodiments could include that the processor increases the rule weighted accuracy metric in response to analyzing the plurality of access event records.

In addition to one or more of the features described above, or as an alternative, further embodiments could include that the processor analyzes each rule with the plurality of static permission records with respect to at least one of the plurality of access event records and the log of administrator actions to determine a weighted rule statistical significance metric.

In addition to one or more of the features described above, or as an alternative, further embodiments could include that the processor increases the rule weighted statistical significance metric in response to analyzing the plurality of access event records.

In addition to one or more of the features described above, or as an alternative, further embodiments could include a policy editor to display the at least one policy.

In addition to one or more of the features described above, or as an alternative, further embodiments could include that the at least one policy is arranged in response to the plurality of access event records via the policy editor.

In addition to one or more of the features described above, or as an alternative, further embodiments could include that the at least one policy is arranged in response to at least one of: a number of credential holders with a selected user properties, a number of credential holders with static permissions to a selected access level, and a number of credential holders using their permissions to a selected access level.

According to one embodiment, a method of generating at least one policy includes providing a plurality of static permission records in a static resource database identifying access permissions for at least one credential holder to the at least one resource, analyzing the plurality of static permission records via a processor, generating the at least one policy via the processor, wherein an outcome of execution of the at least one policy corresponds to the plurality of static permission records, and providing the plurality of policies in a policy database.

According to one embodiment, a computer program product embodied on a tangible computer readable storage medium, the computer program product including instructions for causing a processor to execute operations includes providing a plurality of static permission records in a static resource database identifying access permissions for at least one credential holder to the at least one resource, analyzing the plurality of static permission records via a processor, generating the at least one policy via the processor, wherein an outcome of execution of the at least one policy corresponds to the plurality of static permission records, and providing the plurality of policies in a policy database.

According to one embodiment, a system for generating at least one policy includes an access events database containing at least one of a plurality of access event records, and a processor to analyze the plurality of access events records to generate at least one policy, wherein an outcome of execution of the at least one policy corresponds to the plurality of access event records.

According to one embodiment, a for generating at least one anomaly record includes a static permission database containing a plurality of static permission records identifying access permissions for at least one credential holder to at least one resource, and an access events database containing a plurality of access event records, an anomaly database to contain the at least one anomaly record, and a processor to analyze the plurality of static permission records and the plurality of access event records to generate at least one anomaly record, wherein the at least one anomaly record corresponds to a statistical outlier of at least one of the plurality of static permission records and the plurality of access event records.

In addition to one or more of the features described above, or as an alternative, further embodiments could include that a user interface prompts an administrator to declare the at least one anomaly record as an exception record.

In addition to one or more of the features described above, or as an alternative, further embodiments could include that in the processor analyzes the exception record to determine at least one of a policy statistical significance and a policy accuracy value.

Other aspects, features, and techniques will become more apparent from the following description taken in conjunction with the drawings.

BRIEF DESCRIPTION OF THE SEVERAL VIEWS OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

DETAILED DESCRIPTION

Figure 1:
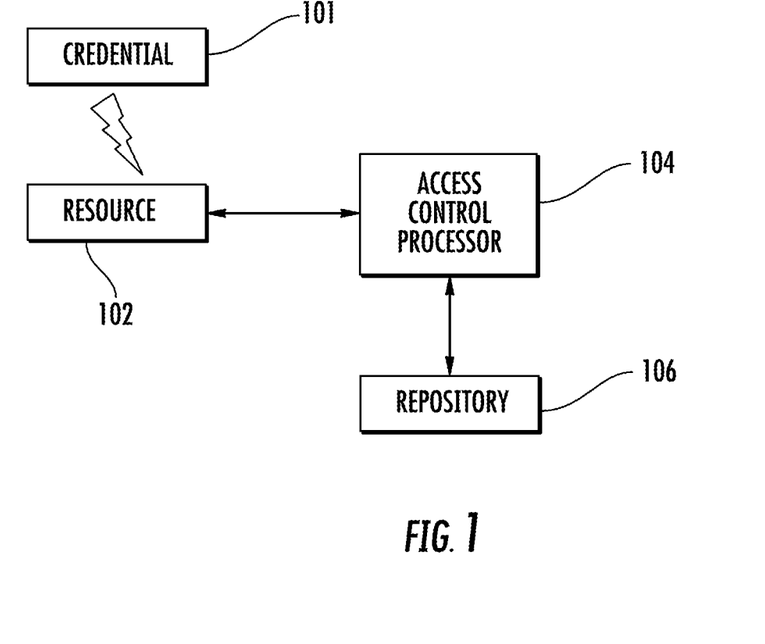
FIG. 1 is a schematic view of a physical access control system in accordance with an embodiment.

Referring now to the drawings, FIG. 1 illustrates a general schematic of an exemplary physical access control system 100 for use with the rule-based policy generation system and method in accordance with an embodiment. In an embodiment, physical access control system 100 is a physical access control system to control access to resources. Physical access control system 100 includes resource 102, access control processor 104, and repository 106.

Resource 102 of physical access control system 100 may include areas or resources that are secured by readers, locks, doors, or other physical barriers. In an exemplary embodiment, credentials 101, such as identification cards are used to interface with resource 102. In certain embodiments, the resources can be physical or logical. In certain embodiments, multiple resources 102 are grouped together in collections of resources in a certain area.

Repository 106 contains static permission records that provide access information regarding specific users and specific resources. In an exemplary embodiment, static permission records include information regarding circumstantial access, such as time of day. In certain embodiments, static permission records provide, allow, or deny determination for a certain user, with corresponding credentials, for a certain resource or group of resources for a certain time of day. In certain embodiments, static permission records and other sources of information such as access event logs, administrator logs etc. can further provide permission usage, cardholder access behavior, and denial of access events. As previously discussed, static permission records may not be compatible with rule-based policy management systems, requiring creating policies corresponding to the legacy static permission records to transition to a rule-based policy management system. Creating policies corresponding to the static permissions may be time intensive and introduce errors. Repository 106 may contain multiple databases or repositories. During and after such generation of policies, repository 106 can also contain the corresponding rule-based policies.

Access control processor 104 may be a general-purpose processor executing operations in response to program instructions stored on a storage medium. Access control processor 104 receives inputs from resource 102 and processes inputs received and creates an allow or deny determination based on records stored in repository 106. In an exemplary embodiment, access control processor 104 provides a real time or near real time determination to allow or deny a user access based on static permission records. The access control processor 104 responds to a request for entry by checking whether there is a static permission stored in the system that would allow the credential to unlock the door at the given time of day. In the illustrated embodiment, only if such permission is stored, an access to the resource is granted. Conventionally, access control processor 104 is a simple processor to compare credentials provided by resource 102 to static records received by repository 106. After transitioning to a rule-based policy system, the access control processor 104 may be replaced, or reprogrammed to allow dynamic operation. A rule based policy generation system that interfaces with such a system allows for streamlined, automated, and more robust generation of rule-based policies corresponding to static permissions without introducing the cost of manually generating policies corresponding/explaining the previous static permission set.

Although a particular physical access control system is illustrated and described in the disclosed embodiment, it will be appreciated that other configurations and/or machines include other access control systems that may operate in commercial buildings, vehicles, and other applications may also benefit from embodiments disclosed.

Figure 2:
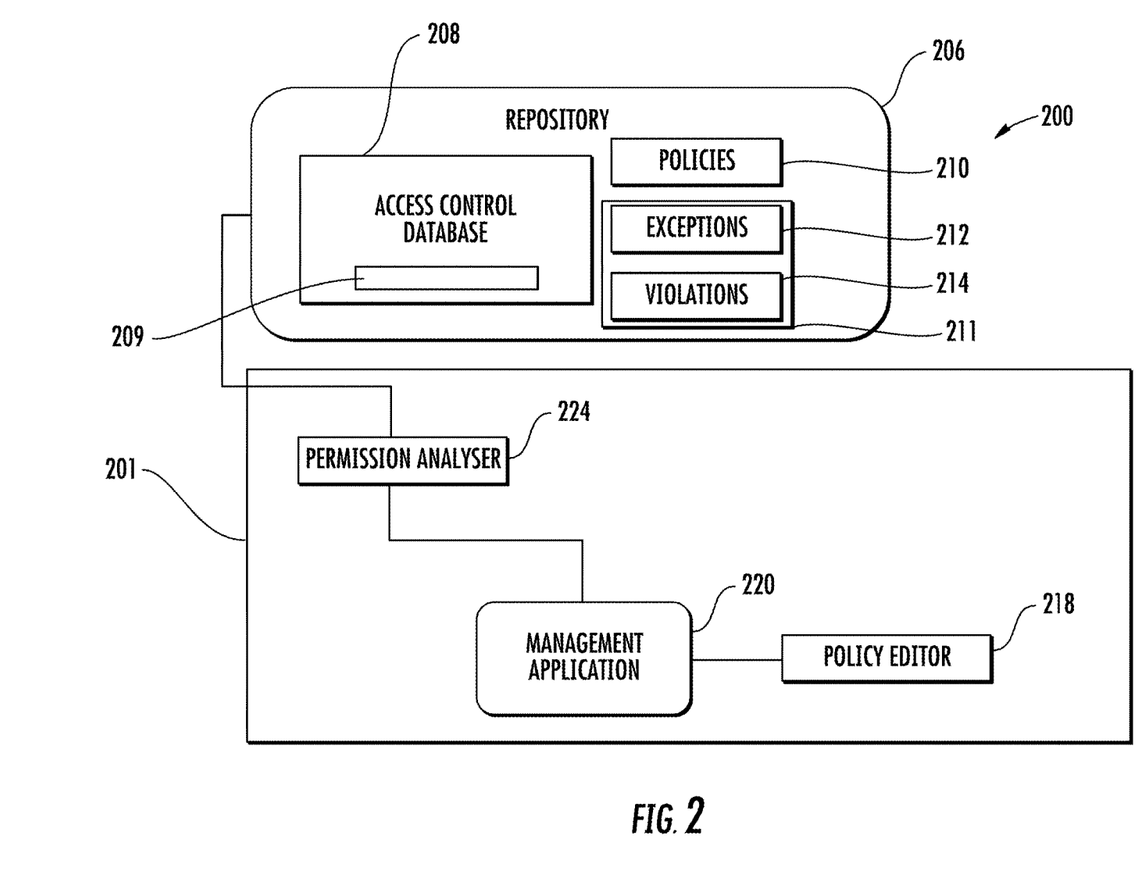
FIG. 2 illustrates a schematic view of an exemplary generation system for use with a physical access control system in accordance with an embodiment.

As illustrated in FIG. 2, rule-based generation system 200 interfaces with repository 206. Rule-based generation system 200 includes a processor 201, which may be part of a computer or server. Processor 201 may be a general-purpose processor executing operations in response to program instructions stored on a storage medium. In an exemplary embodiment, repository 206 is a repository of a physical access control system that utilizes static permissions to perform an allow or deny determination with respect to a resource or a group or resources. In the illustrated embodiment, the repository 206 is also a repository of rule-based policies corresponding to the static permissions. Generation system 200 includes repository 206, management application 220, and permission analyzer 224. Components of generation system 200 may be physically connected or operatively connected.

In an exemplary embodiment, repository 206 contains access control database 208, policy database 210, exception database 212, and violation database 214. In certain embodiments, repository 206 contains a combination of access control database 208, policy database 210 and a group including, but not limited to, exception database 212, and violation database 214.

In exemplary embodiments, access control database 208 includes the information contemplated in access control database of repository 106. In certain embodiments, access control database 208 contains standard data captured by an access control system, such as information about users, resources, permissions, activity logs etc. In certain embodiments, the access control database 209 can include access event records in an access event database 209.

In an exemplary embodiment, policy database 210 contains rule-based policies corresponding to the legacy static permissions of a physical access control system, such as physical access control repository 106. Such policies describe appropriate access permissions as an outcome of logical rules based on the properties of users, resources and environment, where resources refer to areas, doors, locks etc. and environment refers to time, threat level etc. For example, a policy might contain Rules 1 and 2 where Rule 1 states that users who are not US persons should not have access at any given time to areas designated as being subject to export control, while Rule 2 states that users who are members of Engineering department should have access to areas designated as research labs during weekdays from 7 am to 8 pm. In an exemplary embodiment multiple policies are stored in the repository.

A permission analyzer 224 may allow for transition from static permission based access control system to a rule-based policy system. In exemplary embodiments, the policies are created by the permission analyzer 224 to correspond or otherwise explain the legacy static permissions. Permission analyzer 224 performs analysis of static permissions to find patterns that can be utilized to determine rule based policies. Advantageously, the permission analyzer 224 can additionally analyze access patterns and administrator logs to detect anomalies and close possible security gaps.

In an exemplary embodiment, the permission analyzer 224 utilizes an algorithm, including, but not limited to, frequent item set mining, in which frequent cardholders attribute values (items) are extracted from the static permission database of cardholders. In certain embodiments, several approaches can be utilized, including, but not limited to pattern mining, etc. If the item set is discriminative enough (confidence) for a given access level, a rule is extracted. For example, for a given access level, if 70 out of 100 cardholders with the access level have also department R&D and 10 out of 500 cardholders without the access level have also department R&D, the permissions analyzer 224 may create a rule to assign everyone in the R&D department the given access level and declare these 10 cardholders out of 500 as possible violations with possible missing permissions.

In another example, for a given access level, if 300 out of 500 cardholders without the access level have also Badge type HQ-Emp and title different from manager and 0 out 100 cardholders with the access level have also Badge type equals to HQ-Emp and title different from manager, the permission analyzer 224 can create a rule that if Badge-Type equals HQ-Emp and title is not manager, then deny access level.

In certain embodiments, the permission analyzer 224 can take as an input the existing official policy (written by the administrator or learned by the algorithm) in order to understand which attributes and access levels are security relevant and try to improve existing official policy completeness.

Advantageously, the permission analyzer 224 can generate analysis and metrics regarding the quality of the generated rules. In an exemplary embodiment, the permission analyzer 224 will create rules only if the confidence of the rule is above a threshold. In other embodiments, the permission analyzer 224 could use thresholds for explanatory power or complexity to determine whether to create rules. In certain embodiments, the permission analyzer 224 can analyze and score each rule based on its explanatory power, confidence and complexity.

Confidence is the percentage of cardholders who fulfill the conditions of the rule and also experience the outcome described by the rule. Generally, confidence can be used as a metric to measure the accuracy of the rule.

Explanatory power is the percentage of cardholders that experience the outcome described by the rule and also fulfill the conditions of the rule. Generally, explanatory power can be used as a metric to measure the statistical significance of the rule.

For example, the permission analyser 224 identifies that 98% of the cardholders with Badge Type "Contractor" do not have access level "Lab NY". If the permission analyser 224 identifies this relationship as a rule, this rule applies to 60% of the cardholders who do not have access to access level "Lab NY". In this example, the confidence of the rule is 98% and the explanatory power is 60%. If the confidence percentage is high, the rule may be considered accurate, while if the confidence is low the rule may not be considered accurate. In an exemplary embodiment, the process of generating rules can continue until the rule-based policy can explain the whole set of static permissions, such that all the rules explain all assignments or absence of assignments.

Additionally, the complexity of a rule can be considered. Complexity can be evaluated by the number of attributes in the rule. If rule complexity is high, a rule may be specific and difficult to interpret, while if the complexity is low, the rule is general and easier to interpret.

In certain embodiments, the confidence and explanatory power metrics can further be weighted to be evaluated as weighted metrics. In certain embodiments, the weight can designate the importance as well as the likelihood that given permission is correct. In certain embodiments, the access event database 209 can be analyzed to determine permission usage, cardholder access behavior and denial of access events. The access event database 209 may include time stamped logs that contain information about cardholder permissions access actions, such as access allowed or denied entries. Analysis can include usage of permission to determine if a cardholder uses the assigned permission. For example, if a permission is assigned to a cardholder but has not been used, the weight of this permission is decreased. Alternatively, if the permission is assigned to a cardholder and has been used very often, the weight of this permission increases. Analysis can further include analyzing cardholder reputation and behavior. In certain embodiments, cardholder access patterns are extracted from the access event database 209. For example, based on the frequency of the cardholders access patterns a reputation score can be computed in a way that cardholders with erratic/inconsistent access patterns will have lower reputation than cardholders with uniform/unchanging access patterns. In certain embodiments, weights of permission assignments of a cardholder will depend on the cardholder's reputation. Additionally, analysis can further include analyzing denial of access. In certain embodiments, the access event database 209 also records denials of access (someone tries to enter a room and the reader denies him access). For example, if a cardholder does not have a permission, but in the access event database 209 it is observed that several denials of access have occurred, the weight of the absence of that permissions decreases. Similarly, access denials followed by adding of permissions for denied cardholders increases the weight of permission presence.

In certain embodiments, administrator activity logs can be analyzed to determine weighting information. Administrator logs can record administrator actions such as modification of cardholder attributes, adding or removing permissions, etc. In certain embodiments, analysis can determine and weigh reputation of a given administrator. For example, a reputation score can be computed for each administrator based on how long an administrator has been performing administration tasks, what is the level of experience on assigning a specific permission and the administrator's previous history of wrongly assigning a permission. If at the time of assigning a permission, the administrator reputation was low, the weight of the permission decreases. Analysis can further include weighing context during provisioning. For example, if when the permission was assigned, the administrator was assigning many other permissions to the same cardholder, the weight of the permission decreases (since mistakes may be likely). Alternatively, if the administrator only assigned that specific permission to the cardholders (thoughtful action), the weight of the permission increases. In certain embodiments, permission and/or cardholder history is analyzed and weighted. For example, if the attributes of the cardholder were modified and didn't result in a permission change, the weights of the permissions of this cardholder decrease. Alternatively, if we observe in the history of a permission that the expiration date is usually set to few days, and a cardholder has this permission for a much longer period (e.g. 1 month), the weight of the cardholder's permission decreases.

In certain embodiments, the permission analyzer 224 can utilize an inference engine to weight confidence and explanatory power metrics to take into account the weighted value of the permission assignments. In certain embodiment, to calculate the weighted metrics, each permission explained by a given rule is weighted and given a multiplier to provide more influence to those permissions that are considered more important. In certain embodiments, a weighted explanatory power and a weighted confidence metric is calculated and utilized.

In an exemplary embodiment, the explanatory power, confidence and complexity of a rule can be presented to an administrator via policy editor 218 and management application 220. By reviewing the explanatory power, confidence and complexity of a rule, the impact of the rule on the overall policy can be determined. The impact of a candidate rule over the current official policy is related to the number of permissions the candidate rule can accurately explain that were not explained through the current official policy and the increase of policy complexity to accomplish this. The policy editor 218 can display suggested rules with the impact of the rule on the overall policy. Additionally, the policy editor 218 can display the impact of combining, adding, removing, overriding and adjusting the hierarchy of the rules. Further, additional rules can be suggested based on feedback provided. If the administrator accepts a presented rule, the rule may be incorporated as an official policy rule. Additionally, other rules may be stored as statistically significant rules. In certain embodiments, the rules can be sorted to be shown in a desired order in the policy editor 218. In certain embodiments, the sorting can be based on the number of credential holders with a given user properties (e.g. rules involving credential holders from R&D Dept. are displayed first as 75% of all credential holders are from R&D dept.). In certain embodiments, the policy editor can sort rules based on the number of credential holders with static permissions to a given access level (e.g. rules involving credential holders with static permissions to "EH Perimeter Doors" are displayed first as 100% of all credential holders have access to "EH Perimeter Doors). In other embodiments, the policy editor 218 can sort the rules based on the number of credential holders using their permissions to a given access level (e.g. rules involving credential holders with static permissions to "EH Perimeter Doors" are displayed first as 80% of all credential holders have used access to "EH Perimeter Doors).

Permission analyser 224 may operate under the assumption that if a pattern (rule) is shared among a significant amount of cardholders (explanatory threshold) except for some cardholders (confidence threshold) then it is likely that the later cardholders are anomalies. For example, the permission analyser 224 identifies that 98% of the cardholders with Badge Type "Contractor" are denied to access to access level "Lab NY". This means it is likely that the 2% of the cardholders with Badge Type "Contractor" with access to access level "Lab NY" has Lab NY anomalous permission. Such anomalous permissions may be identified as violations to be corrected or as exceptions to be allowed.

In exemplary embodiments, management application 220 and permission analyzer 224 allows administrators to automatically identify access permissions, which violate a selected policy and register them in the violations repository 214, and then analyze and resolve policy violations. In an exemplary embodiment, the violations database 214 contains records of violations wherein the static permissions differ from the expected results. After the policy is applied to a specific user or a group of users, the result is compared to each of the respective static permissions to record deviations, or violations. In an exemplary embodiment, such violations can result when deviations include more permissions than expected or less permissions than expected. In an exemplary embodiment, resulting violations can result in the rule being changed or an exception being granted for the static permission. In an exemplary embodiment, violations repository or database 214 contains the list of violations, including the violations that occurred in the past or that are currently active. For each violation, violation repository 214 stores a reference to the particular version of the policy that it was violating as well as the date/time it was detected. In certain embodiments, the violation repository can contain a committed violation repository which contains records of violations wherein the access records differ from the expected results of the created policies.

In certain embodiments, management application 220 permission analyzer 224 allows administrators to further declare exceptions (which can also include expiration dates) to policy violations in exceptions repository 212, which are then no longer considered as violations until the exception has expired or has been explicitly revoked. In an exemplary embodiment, exceptions database 212 contains records of exceptions, which are designated as exempt from requirement to satisfy policies allowing an evaluated exception to continue to violate a rule or policy. In certain embodiments, exceptions can also be associated with an expiration time, after which the permission non-compliant with a policy would be considered as a violation.

In certain embodiments violations from the violation repository 214 as well as exceptions from the exceptions repository 212 can be generally identified as anomalies in an anomaly database 211. In certain embodiments, each anomaly of the anomaly database 211 corresponds to a statistical outlier with respect to at least one rule and the plurality of static permission records. Advantageously, these anomalies in the anomaly database 211 can be analyzed by the permission analyzer 224 to determine additional or other policies. In certain embodiments, what appear to be exceptions to policies are really instances of another rule that was not captured in the system. For example, an occurrence where all the members of Department D1 from Building B1 are being exempted to have access to Access Level AL1, even though the current rules prevent it. Therefore, if the permission analyzer 224 reviews the anomalies captured and determine that the anomalies follow a specific pattern, the permission analyzer 224 may suggest to allow members from D1 and B1 to have access level ALL Advantageously, if such a rule is incorporated, a number of exceptions can be eliminated from the system and administrator would no longer be required to manually give such exceptions.

In certain embodiments, the functionality of permission analyzer 224 is incorporated in management application 220, while in other embodiments; permission analyzer 224 is a separate component, while in other embodiments permission analyzer 224 is configured in any suitable manner.

Figure 3:
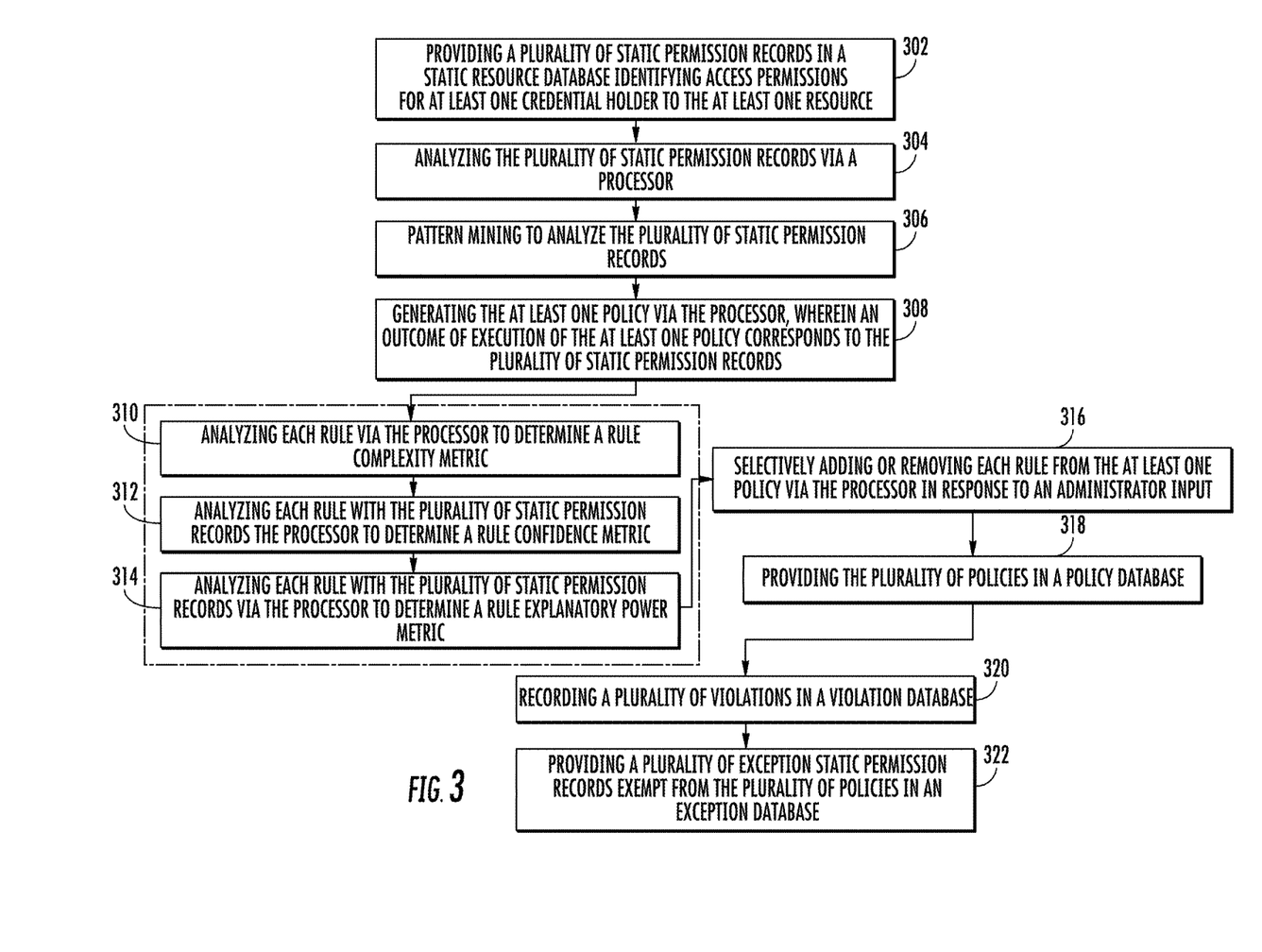
FIG. 3 is a flow diagram of a method of generating rule-based polices from static permissions within a physical access control system in accordance with an embodiment.

FIG. 3 illustrates a method 300 for generating rule-based policies for a physical access control system. In operation 302, a plurality of static permission records are provided in a static resource database identifying access permissions for at least one credential holder to the at least one resource. In certain embodiments, the static permission records are pre-existing. In an exemplary embodiment, the access control database contains standard data captured by an access control system, such as information about users, resources, permissions, activity logs etc. In operation 304, the plurality of static permission records are analyzed via a processor, such as described in operation 306. In certain embodiments, the processor can further analyze corresponding access event records and administrator logs to weight each of the static permission records and resulting policies created. In operation 306, patterns are identified to analyze the plurality of static permission records. In an exemplary embodiment, the permission analyzer utilizes machine learning techniques such as pattern mining, in which frequent combinations of cardholder attribute values (items) are extracted from the static permission database of cardholders.

In operation 308, at least one policy is generated via the processor, wherein an outcome of execution of that policy corresponds to the plurality of static permission records. The permission analyzer can suggest a rule if the item set is discriminative, significant and simple enough (based on confidence, explanatory power and complexity thresholds) for a given access level.

In operations 310, 312, and 314 metrics relating to evaluating the rule-based policies are calculated. These metrics may be calculated independently or concurrently. In operation 310, each rule is analyzed via the processor to determine a rule complexity metric. Complexity can be evaluated by the number of attributes in the rule. If rule complexity is high, a rule may be specific and difficult to interpret, while if the complexity is low, the rule is general and easier to interpret.

In operation 312, each rule is analyzed with the plurality of static permission records via the processor to determine a rule confidence metric. Confidence is the percentage of cardholders who fulfill the conditions of the rule and also experience the outcome described by the rule. In certain embodiments, the rule confidence metric can be a weighted confidence metric by analyzing access event databases and administrator logs.

In operation 314, each rule is analyzed with the plurality of static permission records via the processor to determine a rule explanatory power metric. Explanatory power is the percentage of cardholders that experience the outcome described by the rule and also fulfill the conditions of the rule. In certain embodiments, the rule explanatory power metric can be a weighted confidence metric by analyzing access event databases and administrator logs.

In operation 316, each rule is selectively added or removed from at least one policy or modified via the processor in response to an administrator input. In an exemplary embodiment, the explanatory power, confidence and complexity of a rule can be presented to an administrator via policy editor and management application. By reviewing the explanatory power, confidence and complexity of a rule, the impact of the rule on the overall policy can be determined. The administrator can utilize this information to determine if a rule should be added or removed from the policy.

In operation 318, the plurality of policies are provided in a policy database. In an exemplary embodiment, the policies may be previously recorded or could be recorded using the method herein. In an exemplary embodiment, policy repository includes policies which describe appropriate access permissions as an outcome of logical rules based on the properties of users, resources and environment.

In operation 320, a plurality of violations are recorded in a violation database. In an exemplary embodiment, the violation database contains the list of violations, including the violations that occurred in the past or that are currently active. In certain embodiments, for each violation, the violation repository stores a reference to the particular version of the policy that it was violating as well as the date/time it was detected.

In operation 322, a plurality of exception static permission records exempt from the plurality of policies are recorded in an exception database. After the violations are reviewed, exception static permission records are recorded that do not comply with the defined policies. In certain embodiments, the exception database as previously described is utilized. In other embodiments, any suitable method is utilized. In certain embodiments, the exceptions and violations can be generally stored in an anomaly database. Therefore, in certain embodiments, the permission analyzer can review the anomalies captured and determine that if the anomalies follow a specific pattern, the permission analyzer may suggest a new rule or policy.

As described above, exemplary embodiments can be in the form of processor-implemented processes and devices for practicing those processes, such as processor 201. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A system for generating at least one policy, the system comprising:
   a static permission database containing a plurality of static permission records identifying access permissions for at least one credential holder to at least one resource;
   a policy database; and
   a processor to analyze the plurality of static permission records to generate the at least one policy, wherein an outcome of execution of the at least one policy corresponds to the plurality of static permission records;
   wherein the processor utilizes pattern mining to analyze the plurality of static permission records to generate the at least one policy, the processor configured to generate the at least one policy upon a confidence associated with a rule of the policy being above a threshold.

2. The system of claim 1, wherein the at least one policy is a collection of one or more rules and each rule including at least one of user properties, resource properties, and environment properties, each rule including an access decision which determines whether a corresponding user satisfying the user properties can or cannot have access to the at least one resource satisfying the resource properties, in an environment satisfying the environment properties.

3. The system of claim 2, wherein the processor analyzes an impact of each rule on the at least one policy.

4. The system of claim 2, wherein the processor selectively adds, removes or modifies each rule from the at least one policy in response to an administrator input.

5. The system of claim 2, wherein the processor analyzes each rule to determine a rule complexity metric.

6. The system of claim 2, wherein the processor analyzes each rule with the plurality of static permission records to determine a rule accuracy metric.

7. The system of claim 2, wherein the processor analyzes each rule with the plurality of static permission records to determine a rule statistical significance metric.

8. The system of claim 1, wherein the processor analyzes the plurality of static permissions to generate an anomaly database.

9. The system of claim 1, further comprising a violation database containing a plurality of static permission records which violate one or more of policies as computed by the processor.

10. The system of claim 1, further comprising a committed violation database containing a plurality of access events records which violate one or more of policies as computed by the processor.

11. The system of claim 1, further comprising an exception database containing a plurality of exception static permission records exempt from the plurality of policies.

12. The system of claim 11, wherein the processor analyzes the plurality of exception static permission records to generate the at least one policy.

13. The system of claim 2, wherein the static permission database contains an access events database containing at least one of a plurality of access event records, and an administrator logs database containing a log of administrator actions and the processor analyzes at least one of the plurality of access event records and the log of administrator actions to generate the at least one policy.

14. The system of claim 13, wherein the processor analyzes each rule with the plurality of static permission records with respect to at least one of the plurality of access event records and the log of administrator actions to determine a weighted rule accuracy metric.

15. The system of claim 14, wherein the processor increases the rule weighted accuracy metric in response to analyzing the plurality of access event records.

16. The system of claim 13, wherein the processor analyzes each rule with the plurality of static permission records with respect to at least one of the plurality of access event records and the log of administrator actions to determine a weighted rule statistical significance metric.

17. The system of claim 16, wherein the processor increases the rule weighted statistical significance metric in response to analyzing the plurality of access event records.

18. The system of claim 13, further comprising a policy editor to display the at least one policy.

19. The system of claim 18, wherein the at least one policy is arranged in response to the plurality of access event records via the policy editor.

20. The system of claim 18, wherein the at least one policy is arranged in response to at least one of: a number of credential holders with a selected user properties, a number of credential holders with static permissions to a selected access level, and a number of credential holders using their permissions to a selected access level.

21. A method of generating at least one policy, comprising:
    providing a plurality of static permission records in a static resource database identifying access permissions for at least one credential holder to at least one resource;
    analyzing the plurality of static permission records via a processor;
    generating the at least one policy via the processor, wherein an outcome of execution of the at least one policy corresponds to the plurality of static permission records; and
    providing the at least one policy in a policy database;
    wherein the processor utilizes pattern mining to analyze the plurality of static permission records to generate the at least one policy, the processor configured to generate the at least one policy upon a confidence associated with a rule of the policy being above a threshold.

22. A computer program product embodied on a tangible computer readable storage medium, the computer program product including instructions for causing a processor to generate at least one policy by executing operations comprising:
    providing a plurality of static permission records in a static resource database identifying access permissions for at least one credential holder to at least one resource;
    analyzing the plurality of static permission records via a processor;
    generating the at least one policy via the processor, wherein an outcome of execution of the at least one policy corresponds to the plurality of static permission records; and
    providing the at least one policy in a policy database;
    wherein the processor utilizes pattern mining to analyze the plurality of static permission records to generate the at least one policy, the processor configured to generate the at least one policy upon a confidence associated with a rule of the policy being above a threshold.

23. A system for generating at least one anomaly record, the system comprising:
    a static permission database containing a plurality of static permission records identifying access permissions for at least one credential holder to at least one resource, and an access events database containing a plurality of access event records;
    an anomaly database to contain the at least one anomaly record; and
    a processor to analyze the plurality of static permission records and the plurality of access event records to generate at least one anomaly record, wherein the at least one anomaly record corresponds to a statistical outlier of at least one of the plurality of static permission records and the plurality of access event records;
    wherein a user interface prompts an administrator to declare the at least one anomaly record as an exception record.

24. The system of claim 23, where in the processor analyzes the exception record to determine at least one of a policy statistical significance and a policy accuracy value.

* * * * *